United States Patent
Woodley et al.

(10) Patent No.: US 9,831,642 B2
(45) Date of Patent: Nov. 28, 2017

(54) VERTICAL SUPPORT FOR SHELVING SYSTEM AND SHELVING SYSTEM

(71) Applicant: OPTO INTERNATIONAL, INC., Wood Dale, IL (US)

(72) Inventors: Brett Woodley, Wilmette, IL (US); Nathan Wells, Chicago, IL (US); Erich Haller, Buffalo Grove, IL (US); Graham Wood, Okatie, SC (US)

(73) Assignee: Opto International, Inc., Wood Dale, IL (US)

( * ) Notice: Subject to any disclaimer, the term of this patent is extended or adjusted under 35 U.S.C. 154(b) by 31 days.

(21) Appl. No.: 15/137,825

(22) Filed: Apr. 25, 2016

(65) Prior Publication Data

US 2017/0310090 A1    Oct. 26, 2017

(51) Int. Cl.
| | |
|---|---|
| H02B 1/04 | (2006.01) |
| H02B 1/20 | (2006.01) |
| A47F 5/08 | (2006.01) |
| A47F 11/10 | (2006.01) |
| A47F 5/10 | (2006.01) |

(Continued)

(52) U.S. Cl.
CPC ............... *H02B 1/20* (2013.01); *A47B 97/00* (2013.01); *A47F 5/0853* (2013.01); *A47F 5/0869* (2013.01); *A47F 5/103* (2013.01); *A47F 11/10* (2013.01); *H01R 25/162* (2013.01); *H02B 1/04* (2013.01); *A47B 2220/0091* (2013.01)

(58) Field of Classification Search
CPC combination set(s) only.
See application file for complete search history.

(56) References Cited

U.S. PATENT DOCUMENTS

| | | | |
|---|---|---|---|
| 2,441,461 A | 5/1948 | Wayne | |
| 2,890,266 A * | 6/1959 | Bollmeier | H01R 4/22 |
| | | | 174/87 |

(Continued)

FOREIGN PATENT DOCUMENTS

| | | |
|---|---|---|
| CH | 601930 | 7/1978 |
| DE | 102007028395 | 12/2008 |

(Continued)

OTHER PUBLICATIONS http://www.houzz.com/photos/15365118/Juno-T47-Outrigger-Track-Mounting-Bracket-T47b.

(Continued)

*Primary Examiner* — Timothy Thompson
*Assistant Examiner* — Krystal Robinson
(74) *Attorney, Agent, or Firm* — Husch Blackwell LLP

(57) ABSTRACT

A vertical support provides for the rapid assembly, disassembly, and modification of a shelving system in a variety of configurations, as determined by the practical and aesthetic requirements of the user. The vertical support facilitates the mounting of a variety of attachment members, such as shelves, hangers, or media boards, that contain powered appliances, allowing the user to further customize the shelving system to his practical and aesthetic requirements. The vertical support makes it easy for a user to mount these attachment members and hides the connections of the various components, to maximize the aesthetic appeal of the shelving display. Additionally, vertical support can be configured with other subcomponents to form shelving systems.

12 Claims, 6 Drawing Sheets

(51) Int. Cl.
*A47B 97/00* (2006.01)
*H01R 25/16* (2006.01)

(56) References Cited

U.S. PATENT DOCUMENTS

| | | | |
|---|---|---|---|
| 3,559,149 A | 1/1971 | Shangena | |
| 3,825,879 A | 7/1974 | Hesse | |
| 4,096,349 A | 6/1978 | Donato | |
| 4,239,932 A | 12/1980 | Textoris et al. | |
| 4,243,284 A | 1/1981 | Humphreys | |
| 4,245,874 A * | 1/1981 | Bishop | H01R 35/02 |
| | | | 174/70 B |
| 4,256,357 A | 3/1981 | Vasseur et al. | |
| 4,312,086 A * | 1/1982 | Bianco | A47B 83/00 |
| | | | 108/108 |
| 4,553,809 A * | 11/1985 | Holt | H01R 4/024 |
| | | | 174/84 R |
| 4,919,625 A | 4/1990 | Coutre | |
| 4,973,796 A * | 11/1990 | Dougherty | E04B 2/82 |
| | | | 174/494 |
| 4,982,054 A * | 1/1991 | De Bruycker | H02G 15/013 |
| | | | 156/49 |
| 5,308,922 A * | 5/1994 | Wallace | H01B 3/40 |
| | | | 174/87 |
| 5,425,648 A * | 6/1995 | Farham | H01R 25/16 |
| | | | 439/116 |
| 5,695,261 A * | 12/1997 | Slesinger | A47F 11/10 |
| | | | 312/223.6 |
| RE36,030 E | 1/1999 | Nadeau | |
| 5,921,190 A | 7/1999 | Wood | |
| 6,033,239 A | 3/2000 | Jaakkola et al. | |
| 6,244,733 B1 | 6/2001 | Fong et al. | |
| 6,527,565 B1 * | 3/2003 | Johns | H01R 25/14 |
| | | | 362/418 |
| 6,813,896 B1 | 11/2004 | Janke et al. | |
| 7,654,834 B1 | 2/2010 | Mier-Langner et al. | |
| 8,967,740 B2 | 3/2015 | Kerner | |
| 9,098,823 B2 * | 8/2015 | Slesinger | H01R 25/142 |
| 9,537,274 B1 * | 1/2017 | Dankelmann | H01R 25/142 |
| 2002/0064980 A1 | 5/2002 | Zhu | |
| 2003/0157819 A1 * | 8/2003 | Healy | H01R 25/14 |
| | | | 439/110 |
| 2003/0224636 A1 * | 12/2003 | Lorenzen | H01R 25/14 |
| | | | 439/110 |
| 2004/0005798 A1 * | 1/2004 | Lin | H01R 25/14 |
| | | | 439/110 |
| 2005/0082239 A1 * | 4/2005 | Laurosch | A47B 21/06 |
| | | | 211/26 |
| 2005/0254262 A1 * | 11/2005 | Chiu | A47F 11/10 |
| | | | 362/648 |
| 2006/0207778 A1 * | 9/2006 | Walter | A47B 96/14 |
| | | | 174/19 |
| 2008/0043456 A1 * | 2/2008 | Bernardini | A47B 57/42 |
| | | | 362/94 |
| 2008/0092782 A1 * | 4/2008 | Daniel | A47B 96/00 |
| | | | 108/50.02 |
| 2009/0152944 A1 * | 6/2009 | Baine | H01R 25/162 |
| | | | 307/12 |
| 2010/0328853 A1 * | 12/2010 | Johnson | H01R 25/16 |
| | | | 361/641 |
| 2011/0141665 A1 * | 6/2011 | Fontana | H02B 1/20 |
| | | | 361/601 |
| 2014/0055987 A1 * | 2/2014 | Lindblom | A47F 3/001 |
| | | | 362/125 |
| 2014/0224875 A1 * | 8/2014 | Slesinger | H01R 25/142 |
| | | | 235/385 |
| 2014/0376213 A1 | 12/2014 | Miedema et al. | |
| 2015/0201762 A1 * | 7/2015 | Walter | F21V 21/35 |
| | | | 211/187 |
| 2015/0333490 A1 * | 11/2015 | Wessel | H01R 4/48 |
| | | | 361/622 |

FOREIGN PATENT DOCUMENTS

| | | |
|---|---|---|
| DE | 102013114289 | 6/2015 |
| EP | 2092853 | 8/2009 |
| EP | 2842461 | 3/2015 |
| WO | 2005099522 | 10/2005 |
| WO | 2011150309 | 12/2011 |

OTHER PUBLICATIONS http://www.lightology.com/index.php?module=prod_detail&prod_id=26038.
http://www.lightology.com/index.php?module=prod_detail&prod_id=26036.
http://www.lightology.com/index.php?module=prod_detail&prod_id=26126.
http://www.lightology.com/index.php?module=prod_detail&prod_id=26097.
http://www.destinationlighting.com/item/connector-juno-single-circuit-track/23101?utm_source=Google&utm_medium=cpc&utrn_campaign=Track/RailLights&gclid=CNKTr-ubyscoCFcYRHwodl.
European Search Report related to European Application No. 17157180.5-1653, dated Jun. 2, 2017 (7 pages).
Machine translation of the Description related to CH601930, dated Aug. 10, 2017 (3 pgs.).
Machine translation of the Claims related to CH601930, dated Aug. 10, 2017 (3 pgs.).
Machine translation of the Description related to EP2092853, dated Aug. 10, 2017 (9 pgs.).
Machine translation of the Claims related to EP2092853, dated Aug. 10, 2017 (3 pgs.).

* cited by examiner

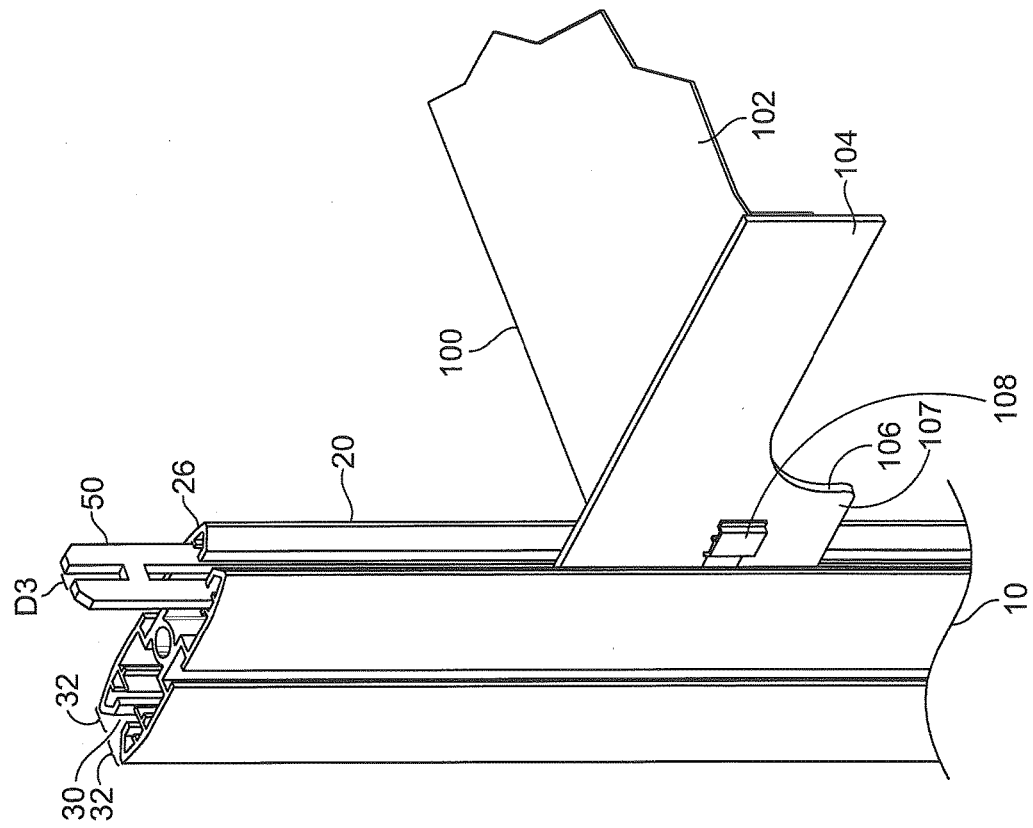
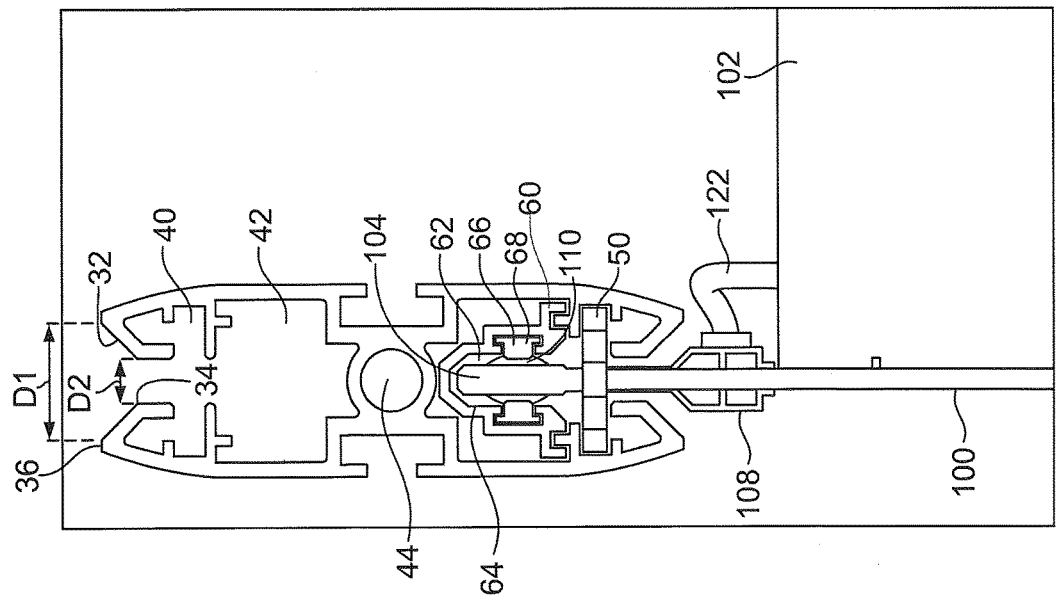
FIG. 3
FIG. 2

VERTICAL SUPPORT FOR SHELVING SYSTEM AND SHELVING SYSTEM

BACKGROUND OF THE INVENTION

The present invention relates to a shelving system and to a vertical support component of a shelving system that is easily assembled, disassembled and modified into a variety of configurations, and supports the addition of an attachment member with a powered appliance, to meet the practical and aesthetic needs of a user.

DESCRIPTION OF THE PRIOR ART

Shelving systems are extensively used by vendors to display goods and products for sale. There is a need for shelving that can be easily assembled, modified after assembly, and disassembled, particularly in sites that are temporary or where the amount or type of goods change frequently. A common problem of such shelving systems are limited numbers of configurations, limiting the number of practical and aesthetic choices for the fully-assembled shelving system.

Another limitation of existing of existing shelving systems is that the locations where the individual vertical supports and attachable elements (i.e., shelves, hangers, media boards) attach are often unsightly and visually unappealing, and detract from the overall aesthetic appeal of the assembled shelving system.

It would be advantageous for a shelving system to support additional attachments to customize the sensory effect of the assembled shelving system, to achieve a variety of desired aesthetic effects, which are not limited solely to visual effects. It would be particularly advantageous for a shelving system (or a vertical support element of a shelving system) to contain an internal power source for providing power to attachment members having power appliances like lights, computer devices, and the like, to customize the aesthetic effect of the assembled shelving unit and to support a variety of functional aspects, such as display audio equipment, computer equipment, communication devices, and devices for facilitating financial transactions.

SUMMARY OF THE INVENTION

It is an object of at least some embodiments of the invention to provide a shelving system that is susceptible of modification, to create displays in spaces of different sizes and to create multiple displays of different configurations to fill the available space. It is also advantageous for a system that is amenable to the expansion (or contraction) of an existing shelving system, as needed, without having to completely disassemble an already-assembled shelving system. It is also advantageous to be able to modify an existing shelving assembly, to save time and money.

It is an object of at least some embodiments to configure a shelving system to meet the aesthetic needs of a vendor, to make a display more visible to a consumer, to attract the attention of a consumer and to direct the consumer's attention to the products offered.

It is an object of at least some embodiments to provide a shelving system with shelves, or other attachments like hangers or baskets, that can hold and display products. It would be advantageous to have a shelving system that supports product display attachments that have electrically- or otherwise-powered appliances to a power source, for example, by transmitting electrical power to attached lights. For example, appliances such as lights or lighting systems would enable a vendor to create visual effects to enhance the aesthetic appeal of the shelving system and the items displayed on it. Lights could also confer a practical benefit in making the shelving system and its contents easier to see.

Other powered appliances could provide other advantages to vendors and consumers. For example, a computer or monitor could provide illustrations of products sold by the vendor or provide additional information about the goods or services offered by a vendor, or provide an aesthetically appealing background to a display. A computer or electronic tablet could provide a route of communication between a consumer and a vendor, for communicating questions and answers about product availability, product details, or other FAQ (frequently asked questions). A credit card device could support electronic sales at the shelving system.

Other powered appliances could be used to add to the aesthetic appeal of the shelving system in non-visual ways. For example, stereo equipment or computer attachments could add to the audio appeal of the display, as well as provide information to a consumer. Other powered devices could provide attractive scents or deodorizing agents to appeal to one's sense of smell.

Shelving systems are also extensively used as décor by individuals and businesses. It would be similarly advantageous to have a shelving system that is easy to assemble, modify, and disassemble for the reasons listed above, and can be configured into a variety of conformations for desired aesthetic effects. It would be similarly advantageous for a shelving system to support powered appliances to provide specific aesthetic effects and to enhance the overall aesthetic effect of the shelving system, and to change the aesthetic effect at will. The flexibility would also confer maximum flexibility in the functional design of the shelving system.

In either scenario, it would be particularly advantageous for a shelving system to support a variety of shelves (or other mountable attachments) in a variety of configurations, to allow maximum flexibility in the design and customization of a shelving system. It would also be advantageous to be able to modify the shelving system at will or to disassemble it.

It would be particularly advantageous for a shelving system to contain a vertically-oriented component, i.e., vertical support, that provides physical support and power to a powered appliance associated with an attachment member (i.e., a lighting fixture on a shelf), in addition to providing attachment sites for engaging attachment members.

The Attachment Sites for the Attachable Elements are Hidden from View to Provide an Enhanced Aesthetic Effect.

It would be particularly advantageous to provide a shelving system that accommodates attachable elements through engaging a vertical support where the site of engagement is in the interior of the vertical support. Placing the attachment sites inside the vertical supports of shelving systems limits their exposure to a very narrow angle of view. Even greater protection from casual view is created by also limiting access to the attachment sites to a longitudinal aperture. Such a configuration shields the attachment sites from casual view, to minimize any distracting effect on the aesthetic appeal of the shelving system.

The Vertical Support Supports Easier Mounting of Attachment Members

One might expect to experience difficulty in mounting an attachable element where the view (and the actual access) to sites of attachment are limited, such as where attaching a shelf requires threading a narrow bracket through a narrow slot into a complementarily-shaped narrow space or channel.

This might be especially problematic where the attachable element connects to the vertical support at a location inside the vertical support, at a site that is intentionally positioned so as to be out of casual view.

It would be advantageous for the vertical support to have a longitudinal entrance or aperture that is tapered inward on each side; for example, having chamfered edges. This inward tapering would provide a wider entry point for insertion of the bracket (or arm, peg, hook, or other means of attachment) into the vertical support and allow insertion to begin from a greater range of entry angles. It would physically guide the edge of the bracket (or other means of attachment) into the appropriate angle to complete its insertion into the vertical support. This particular feature makes it easier to mount the attachable elements onto the shelving system (and make the necessary connections to provide power to the powered appliance associated with the attachable element) while preserving the aesthetic advantages conferred by this design.

An additional feature that contributes to the ease of assembly is in the width of the perforations of the ladder insert relative to the inwardly tapered, longitudinal aperture of the vertical support. Attachment members are mounted onto the shelving system with attachment elements that engage perforations in the vertical support of a shelving system. These perforations are wider than the attachment elements, so that the attachment elements of the attachment members (i.e., the brackets of a shelf) cannot catch on the perforations of the vertical support of the shelving system as they pass through the perforations. In this way, the shelving assembly is made easier to assemble and disassemble, and attachment members are easier to mount to the vertical supports of the shelving systems.

Modular Vertical Supports Provide Flexibility in the Configuration of the Shelving System.

It would be advantageous if the shelving system could be easily modified to allow the mounting of different shelves (or other attachments) at different heights or to support the mounting of shelves (or other attachments). This could be accomplished by including multiple attachment sites within the vertical support.

This could also be accomplished where the shelving system has modular vertical supports, where the vertical supports include replaceable components to support flexibility in assembly, disassembly, and modification of shelving systems. It would be particularly advantageous if this modification were accomplished by engaging or exchanging an individual component of the vertical supports of the shelving system, while still providing power to the mountable attachments, at whatever location the attachment members engage the shelving system and without disturbing the power-supplying portion of the vertical support. Vertical supports could be customized to accommodate with different sized brackets, or to support different amounts of weight, or provide reinforcement at the attachment points. One vertical support could be switched out with a different vertical support to accommodate different aesthetic or practical requirements.

Such vertical supports could confer a great degree of flexibility in assembly, modification, and disassembly. An additional advantage of such a system is that the component could be easily replaced if broken or compromised.

Removable Power Component as a Safety Feature

While embodiments of the vertical support include a power source, it is possible to assemble the other components of the vertical support into a shelving system without the power source. This feature enables the user to decide when to enable the power functions of the shelving system as desired, while leaving the shelving system otherwise intact and usable. This feature also enables a user to disable the power delivery insert to avoid unauthorized (or unsupervised) use of the powered appliances in the attachment members. Similarly, the user may desire to remove the power delivery insert when modifying the shelving system, for reasons of safety.

Because the power-providing component can be segregated from the rest of the shelving system, it can be removed and then replaced when broken or damaged, or can be replaced with an upgraded component or a different type of power-providing component altogether (i.e., battery-operated power source). It can also be removed for inspection and returned to its location within the shelving system, as needed.

BRIEF DESCRIPTION OF THE DRAWINGS

FIG. 2 shows cross-sectional view of the vertical support and a partial cross-sectional view of a shelf with a powered appliance;

FIG. 3 illustrates the insertion of an attachable element into the ladder insert of a vertical support;

DETAILED DESCRIPTION OF THE INVENTION

Figure 1:
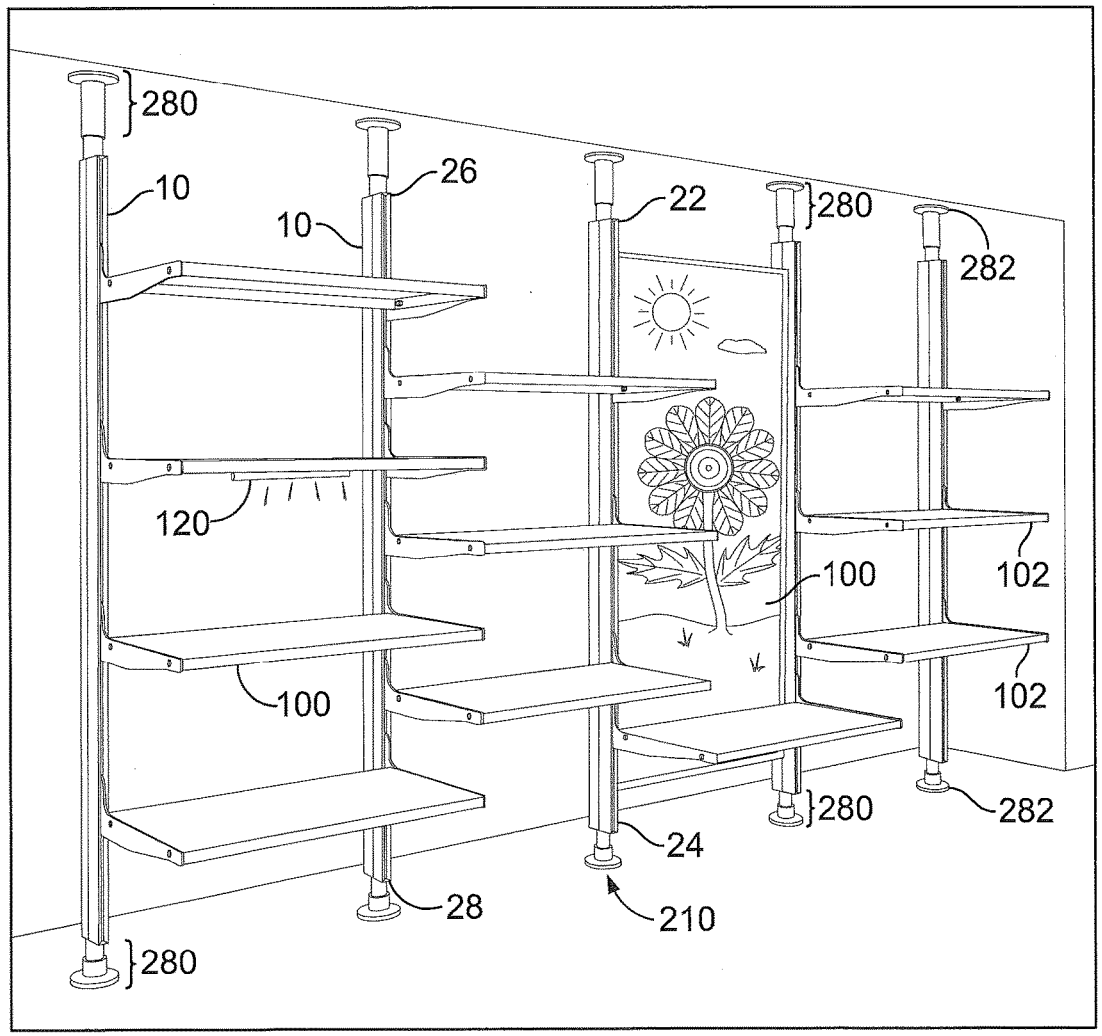
FIG. 1 shows an embodiment of an assembled shelving system installed in an interior space with multiple vertical supports, and shelves with powered appliances and a poster as attachable elements.
Figure 4:
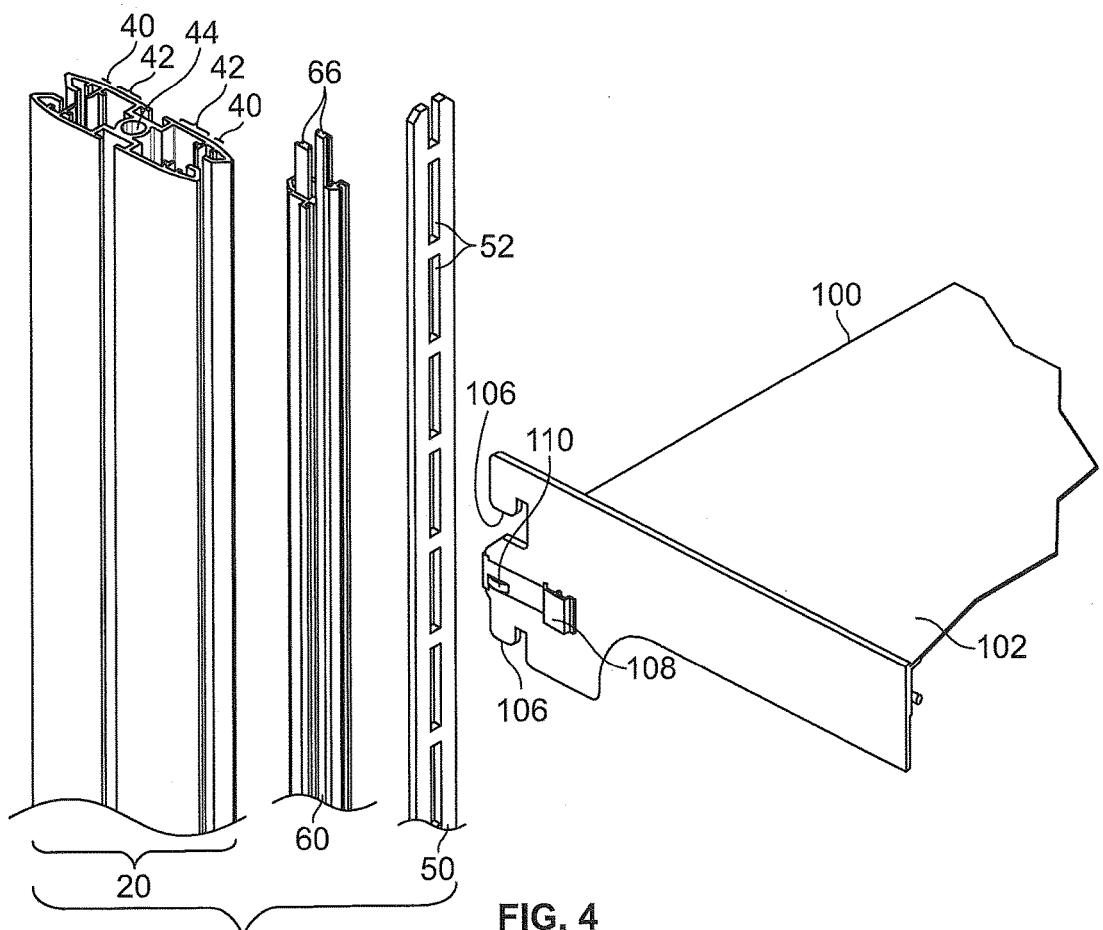
FIG. 4 shows an exploded view the components of a vertical support (external casing, power delivery insert, and ladder insert) and a mountable attachment member with powered appliance and power clip, illustrating how power is transferred from the vertical support to the powered appliance.
Figure 5:
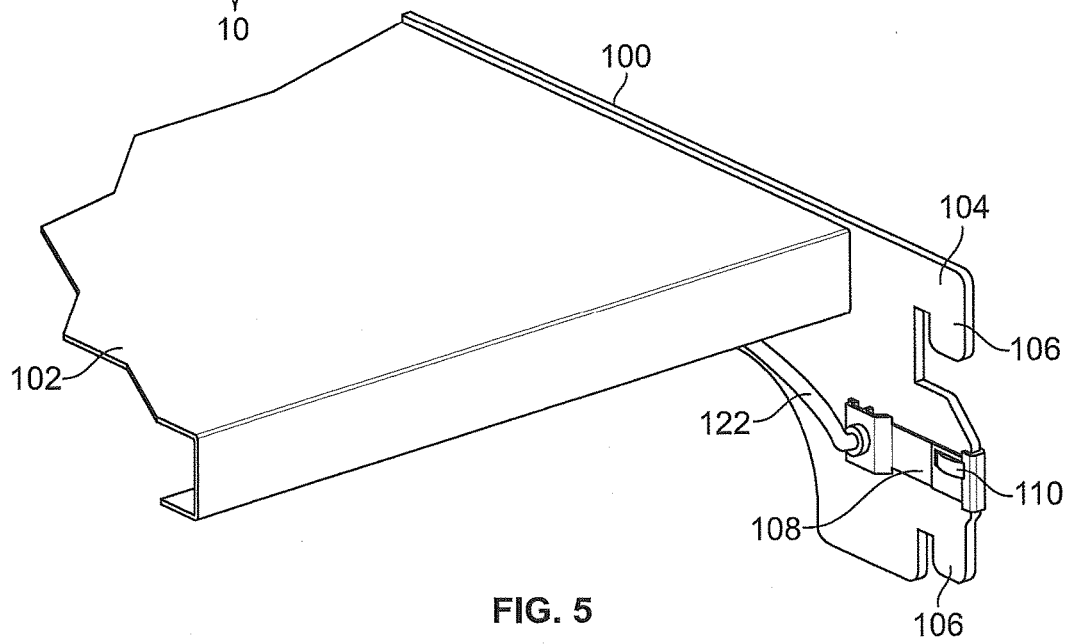
FIG. 5 shows a partial view of a shelf with bracket and power clip, illustrating how power is transferred from the vertical support to the powered appliance.
Figure 6:
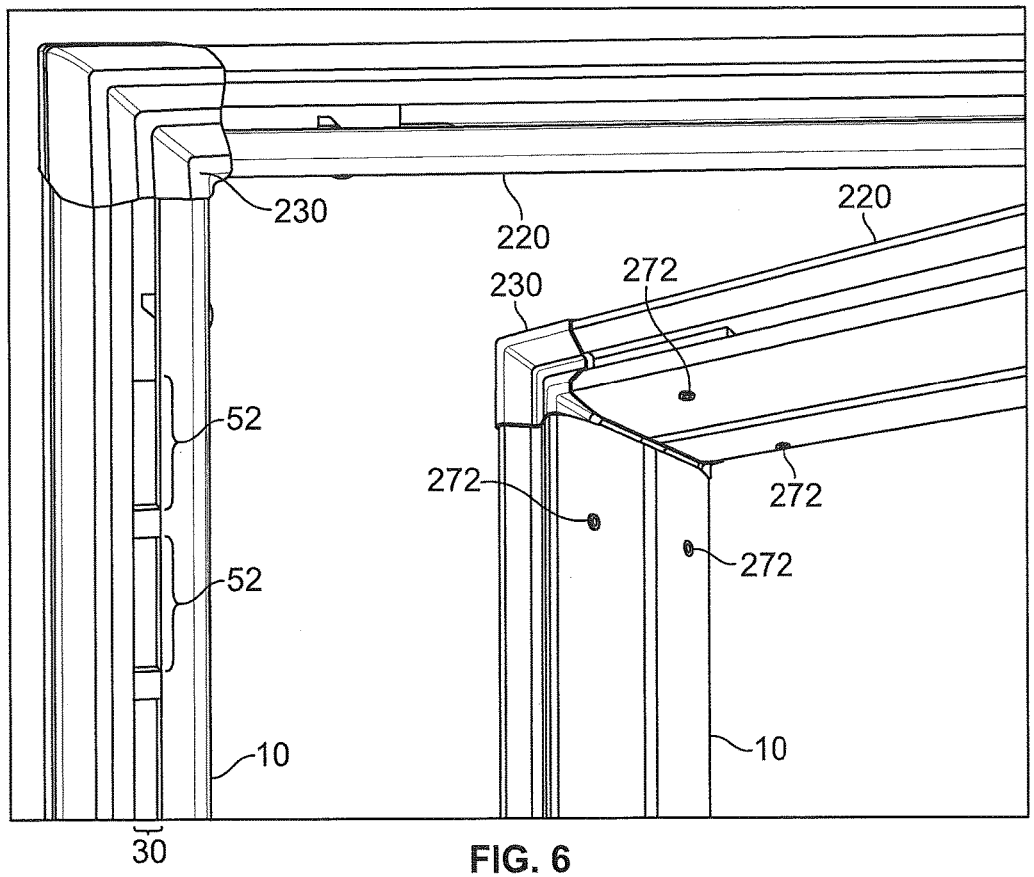
FIG. 6 shows a partial front view of a shelving system incorporating the vertical support connected to another external casing purposed as a horizontal support, and a lower perspective view of the same structure.
Figure 7:
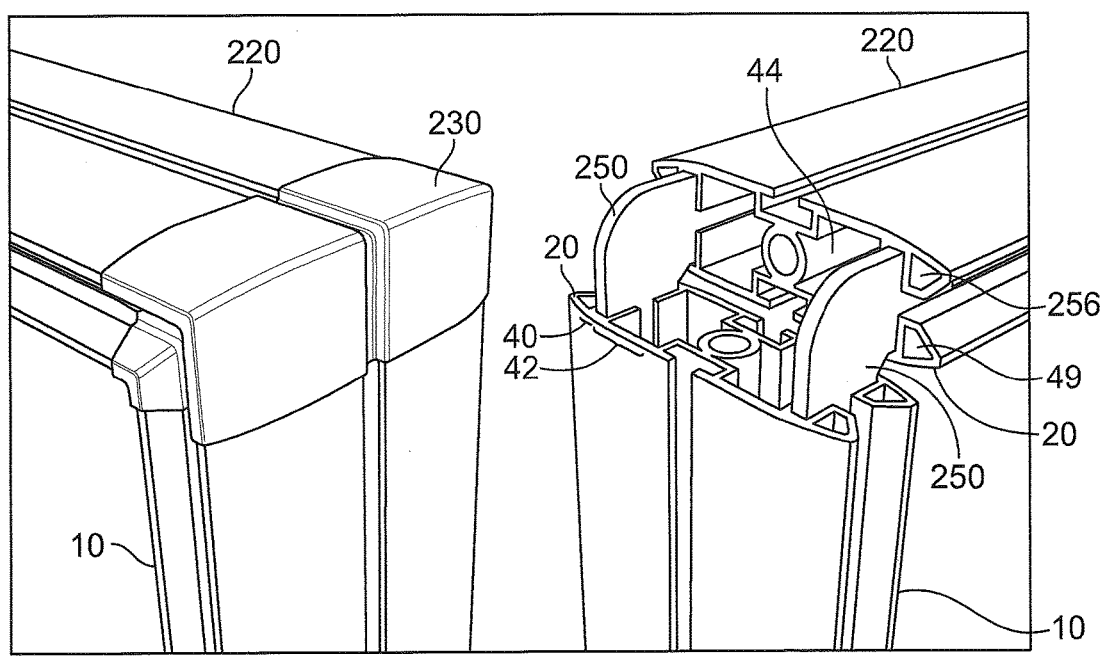
FIG. 7 shows an exterior view of an embodiment of a shelving system incorporating a vertically oriented external casing engaged to a horizontally oriented external casing with an exterior connecting element, and a view of the same structure without the exterior connecting element to show an interior connecting element.
Figure 8:
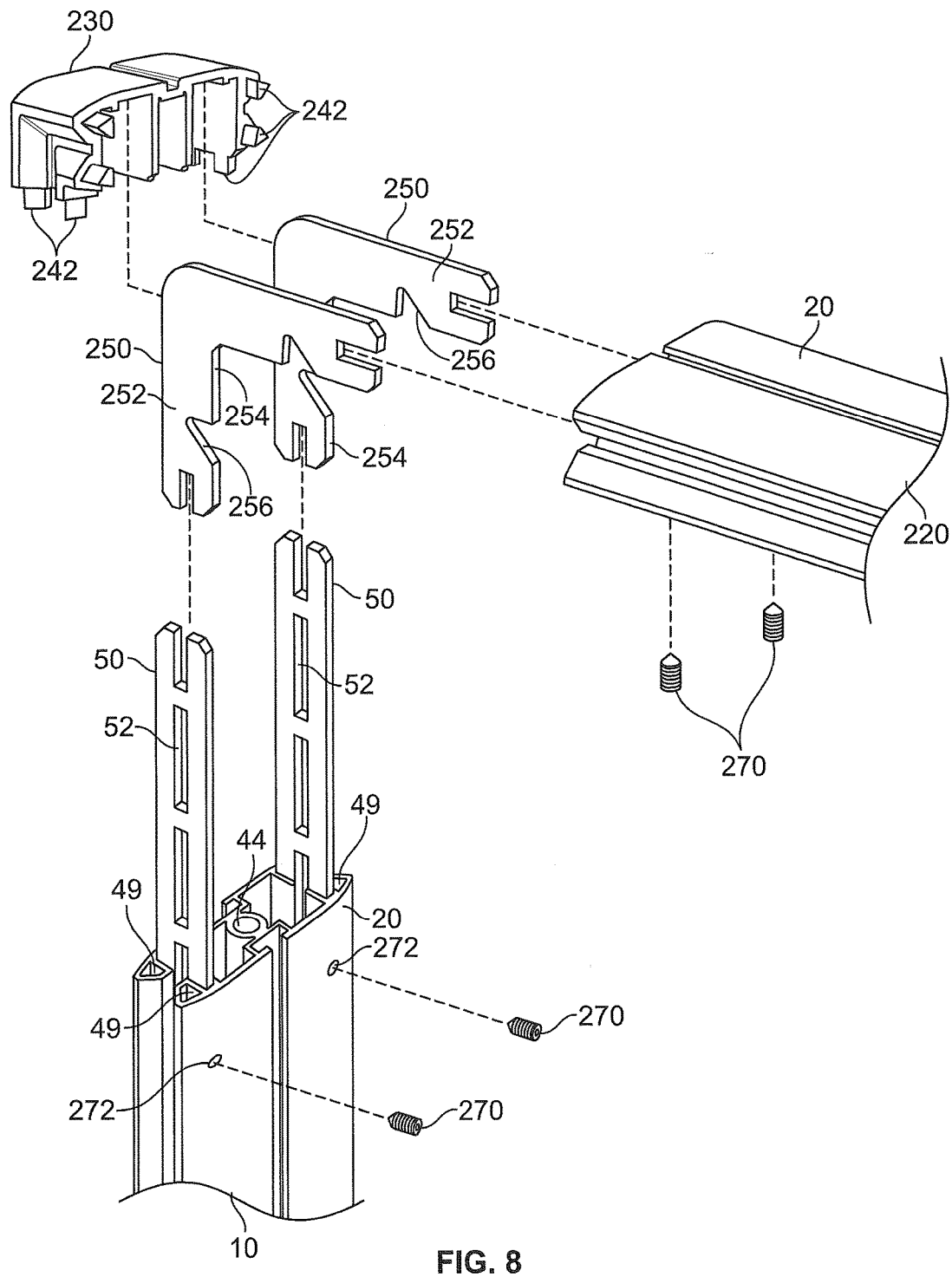
FIG. 8 shows an exploded view of an embodiment of a shelving system incorporating the vertical support with a horizontally oriented external casing with an exterior connecting element, exterior connecting element, and interior connecting element.
Figure 9:
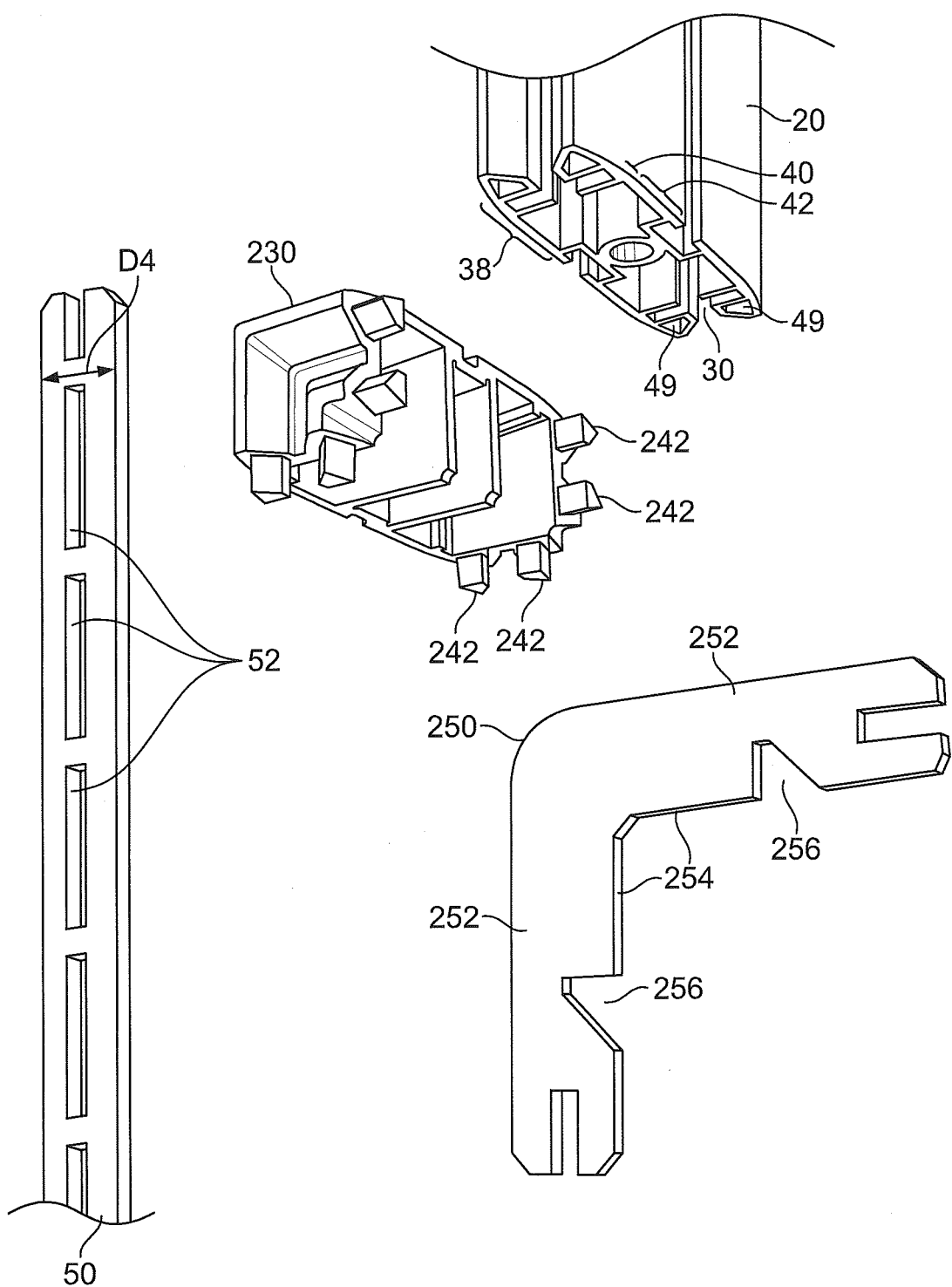
FIG. 9 shows the components required to assemble more than one external casing together: multiple external casings (only one of multiple identical external casings shown), an exterior connecting element, an interior connecting element, and a ladder insert.

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiments.

The features of the invention disclosed herein in the description, drawings, and claims can be significant, both individually and in any desired combinations, for the operation of the invention in its various embodiments. Features from one embodiment can be used in other embodiments of the invention.

It should be further understood that the title of this section of this specification, namely, "Detailed Description Of The Invention," relates to a requirement of the United States Patent & Trademark Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

The disclosed invention includes a shelving system with at least one vertical support supporting at least one mountable attachment member having a powered appliance, which can be configured in a variety of ways to provide a shelving system that is easy to assemble, modify, and disassemble in a variety of configurations according to the practical requirements and aesthetic tastes of its user. See FIGS. 1-9. Some embodiments include multiple vertical supports for connecting one or more attachment members, such as shelves, baskets, hangers, and posters, which contain powered appliances to allow a user to further customize the shelving system to a desired aesthetic.

In some embodiments, the shelving system can use otherwise vertical supports that are buttressed between a floor and ceiling (or other load-bearing lower and upper surfaces); see FIG. 1. In some embodiments, the shelving system can employ components of the vertical supports as horizontally-oriented supports of the shelving system (FIGS. 6-9); further embodiments can employ a variety of connecting elements to attach the vertically-oriented and horizontally-oriented components together. In some embodiments, external connecting elements can attach the external portions of the supports. In some embodiments, internal connecting elements can provide attachment in lieu of, or in addition to, external connecting elements.

In some embodiments, individual components of the shelving system display internal symmetry in at least one plane; that is, a component can be cut in half so that the two halves are mirror images of each other. In preferred embodiments, individual components can display internal symmetry in two or more planes.

Some embodiments of the invention are directed toward the vertical supports of shelving systems having mountable attachment members with powered appliances. The vertical supports of these embodiments contain features that enable a user to customize a shelving system to meet her particular needs and personal tastes with minimum effort in a manner that enhances the aesthetic appeal of the shelving system while also providing power to the powered appliances in the varied configurations

Embodiment 1: Vertical Support for Shelving System

Shelving systems generally include at least one vertically-oriented element that provides structural support for it. Some embodiments of the invention are directed toward a vertical support (10) that promotes ease of assembly in a variety of configurations and enhances the aesthetic appeal of the vertical support and the shelving systems it can be incorporated into, as shown in FIGS. 1-5.

The vertical support (10) can include an external casing (20) with a first end (22) and a second end (24). When in its vertical orientation, the first end (22) is also a top end (26) and the second end (24) is also a bottom end (28) of the external casing (20). The external casing (20) can have a longitudinal aperture (30) that leads to a longitudinal hollow interior (38), which leads to the core (44) of the external casing (20). The longitudinal hollow interior (38) can include a space for receiving a ladder insert (40) and a space for receiving a power delivery insert (42). In some embodiments, the longitudinal aperture (30) is exterior to the ladder insert space (40), which is exterior to the power delivery space (42), which is exterior to the core (44). In more preferred embodiments, a vertical support (10) may have more than one longitudinal hollow interior (38) with ladder insert space (40) and power delivery insert space (42); in even more preferred embodiments, the configuration of one hollow longitudinal interior (38) with ladder insert space (40) and power delivery insert space (42) may form a mirror image of another longitudinal hollow interior (38) with ladder insert space (40) and power delivery insert space (42).

The core (44) can be hollow at its center or can be solid.

In preferred embodiments, the edges (32) of the longitudinal aperture (30) taper inward, so that the outer edges (36) of the longitudinal aperture have a greater distance between them (D1) than the distance between the inner edges (34) of the longitudinal aperture (D2). In more preferred embodiments, the edges (32) are chamfered.

The ladder insert (50) includes a plurality of regularly spaced perforations (52) along its length. The ladder insert (50) can be inserted into the ladder insert space (40) so that the plurality of perforations (52) provide openings that face both the longitudinal aperture (30) and the power delivery insert space (42), providing openings between the longitudinal aperture (30) and the power delivery insert space (42).

When placed in the ladder insert space (40), the ladder insert (50) provides a structure by which a mountable attachment member (100), such as a shelf, hanger, or basket, having a powered appliance (120) can engage the vertical support (10). In some embodiments, one or more perforations (52) of the ladder insert (50) of the vertical support (10) engages the mountable attachment member (100) in a reversible manner; that is, the attachment member (100) can be removed from a perforation (52), if desired, and reengaged at a different perforation (52).

The perforations (52) have a horizontal width (D3) that is greater than the horizontal width of the distance between the inner edges (34) of the longitudinal aperture (D2). The width (D4) of the ladder insert (50) is greater than the distance between the inner edges (34) of the longitudinal aperture (D2). This feature allows attachment elements (104) of an attachment member (100) to pass through a perforation (52) without being caught on it. For example, it would prevent the bracket (106) of a shelf (102) from being blocked from entering a perforation (52).

The power delivery insert (60) provides power from a power source, such as electricity, to the powered appliance (120) that is attached to the attachment member (100). When placed in the power delivery insert space (42), the power delivery insert (60) has a longitudinal channel (62) that faces the ladder insert space (40). When the ladder insert (50) is simultaneously engaged within the vertical external casing (20), the power delivery insert channel (62) faces the perforations (52) of the ladder insert (50). In some embodiments, the power source may be an electrical outlet or may be supplied be other methods, such as by batteries (not shown).

At least two interior sides (64) of the power delivery insert channel (62) have a power transmitter (66) to the powered appliance (120), such as a strip of electrically conductive material (68), for example strips comprising copper. It is preferred that the width of the power delivery insert channel (62) be greater than the horizontal width (D3) of the perforations (52) of the ladder insert (50), again so that there is no obstruction to prevent an attachment element (104) of an attachment member (100) from engaging the power delivery insert channel (62) after it passes through a perforation (52) of the ladder insert (50).

In some embodiments, the vertical support (10) engages power delivery insert channel (62) in a reversible manner; that is, the power delivery insert channel (62) can be inserted into and subsequently removed from the vertical support (10), if desired.

The vertical support (10), with its ladder insert (50) and power delivery insert (60) provide a structure to support a mountable attachment member (100), via the ladder insert (50), and to provide power a powered appliance (120) attached to the attachment member (100), via the power delivery insert (60).

In some embodiments, an attachment member (100) can comprise a shelf (102) with at least one attachment element (104), such as a bracket (106). See FIGS. 4-5. In other embodiments, the attachment member (100) can comprise baskets, hangers, posters, and display monitors. The attachment element (104) can also have a power clip (108) having a power contact (110) on at least two sides (107) of the bracket (106), for providing power to a power cord (122) of the powered appliance (120). In preferred embodiments, the power contact (110) is an electrical contact that conducts electricity.

In some embodiments, the attachment member (100) can be operatively attached to the vertical support (10) by the attachment element (104) by inserting at least one attachment element (104) through at least one perforation (52) of the ladder insert (50) and connecting the attachment element (104) to the power delivery insert channel (62) of the power delivery insert (60) so that the electrical contacts (110) of the attachment element (104) contact the power transmitter (66) on a first interior side and a second interior side (64) of the power delivery insert (60). Thus connected, power can be transmitted to the powered appliance (120).

In preferred embodiments, the attachment member (100) can be operatively attached to the vertical support (10) by the bracket (106) by inserting at least one bracket (106) through at least one perforation (52) of the ladder insert (50) and connecting the bracket (106) to the power delivery insert channel (62) of the power delivery insert (60) so that the electrical power contacts (110) of the bracket (106) contact the strips of electrically conductive material (68) on the interior sides (64) of the power delivery insert (60). Thus connected, power can be transmitted to the powered appliance (120).

In some embodiments, the attachment member (100) has at least two attachment elements (104) engaging the ladder insert (50). For example, a shelf (102) can have a pair of brackets (106) engaging the ladder insert (50), with a power clip (108) having electrical contacts (112) transmitting power through strips of electrically conductive material (i.e., copper) (68) of the power delivery insert (60) to the powered appliance (120) of the shelf (102).

Particularly preferred embodiments can include the following: a vertical support (10) for mounting an attachment member (100) with a powered appliance (120) onto a shelving system (210), the vertical support (10) comprising: an external casing (20) aligned vertically in use with the shelving system (210) having a longitudinal aperture (30) leading to a longitudinal hollow interior (38) comprising a space for receiving a ladder insert (40), and a space for receiving a power delivery insert (42) anterior to the ladder insert space (40); where the ladder insert has a plurality of spaced-apart perforations (52), the horizontal width of the perforations (52) being greater than the width of the longitudinal aperture (30), the ladder insert (50) engaging the ladder insert space (40) so that the plurality of perforations (52) face the longitudinal aperture (30) and the power delivery insert space (42); and where the power delivery insert (60) has a channel (62) for receiving an attachment element (104) of the attachment member (100), the horizontal width of the channel (62) being at least as wide as the horizontal width of the perforations (52) of the ladder insert (50); where a first power transmitter (66) engages an interior side (64) of the channel (62) and a second power transmitter (66) engages a different interior side (64) of the channel (62); and where the power delivery insert (60) engages the power delivery insert space (42) so that the channel (62) faces the plurality of perforations (52) of the ladder insert (50); and where the attachment member (100) includes a power clip (108), a powered appliance (120), and an attachment element (104) for engaging at least one perforation (52) of the ladder insert (50) so that the power clip (108) engages the first and second first power transmitters (66) of the channel (62) to make power available to the powered appliance (120).

Even more preferred embodiments may further include an external casing having a first end (22), a second end (24), and a core (44), and make power available to the powered appliance (120) through a power cord (122) connecting the powered appliance (120) to the power clip (108).

Embodiment 2: Shelving System Incorporating the Vertical Support

The vertical supports (10) can be assembled with the attachment members (100) to create a shelving system (210). In some embodiments, at least one vertical support can be anchored to a ceiling and floor by an anchoring mechanism (280), i.e., suction cups (282); see FIG. 1. Such a shelving system (210) provides display for goods or a décor unit that will support the powered appliances (120).

In some embodiments, a shelving system (210) can be assembled from at least two vertical supports (10) and at least one horizontally-oriented external casing (220), and at least one connector (230) for engaging a vertical support (10) to a horizontally-oriented external casing (220); see FIGS. 6-9. It is preferred that the external casings (20) incorporated into the vertical supports (10) are identical to the horizontally-oriented external casings (220).

In some embodiments, the connector (230) has at least one protrusion (242), preferably a plurality of protrusions (242), that engages corresponding interior connecting spaces (49) in the external casings (20, 220). In some embodiments, the connector can contain interior spaces that mate to corresponding protrusions in the external casings (not shown). When connected via the connector (230), the vertical support (10) and the horizontally-oriented external casing (220); it is preferred that the vertical support (10) and the horizontally-oriented external casing (220) form an angle between 60-120°, more preferred that the angle be between 75-105°, and most preferred that they form an approximate 90° (right) angle. The connector (230) hides the edges of the external casings (20, 220) and the internal portions of the vertical support (10) and the external casings (20, 220) from casual view, thus enhancing the aesthetic appeal of the assembled shelving system (210). See FIGS. 6-7.

In preferred embodiments, the connections between the vertical supports (10) and the horizontally-oriented external casings (220) can be augmented with at least one internal connection piece (250). Each internal connection piece (250) can have an L-shape with two arms (252) and each arm (252) fits into the ladder insert space (40) of an external casing (20, 220). The internal connection piece (250) connects the vertical support (10) and the horizontally-oriented external casing (220) by simultaneously engaging the ladder insert space (40) of the vertical support (10) and the ladder insert space (40) of the horizontally-oriented external casing (220).

In more preferred embodiments, the internal connection piece (250) contains at least one depression (256) on the interior face (254) of each of its arms (252). See FIG. 8. The depressions (256) accommodate a fastener (270), such as a peg, screw, nail, or the like, the internal connection piece (250) to an external casing (20, 220). In some embodiments, the external casings (20, 220) can have at least one fastener hole (272) to guide the fastener (270) to the depression (256) of internal connection piece (250) opposite it.

In some preferred embodiments, at least two internal connection pieces (250) are used to augment the connection between each vertical support (10) and horizontally-oriented external casing (220).

In some preferred embodiments, the two internal connection pieces (250) have at least two dimensions of the same size as the ladder insert (50), i.e., width and depth.

Embodiment 3: Modular Components

In preferred embodiments, the individual components of the vertical support (10) and its individual components, such as the external casing (20), the ladder insert (50), and power delivery insert (60) can be made separately, by different methods incorporating different materials. However, it is preferred that the individual components be made such that each component have internal symmetry in at least one plane; that is, each component can be cut in half so that the two halves are mirror images of each other. In preferred embodiments, individual components can display internal symmetry in two or more planes.

This internal symmetry means that a component can be operatively inserted into its place in the vertical support (10) in multiple orientations. For example, a preferred embodiment of a ladder insert (50) is symmetrical along both its horizontal and vertical planes; thus it can perform the function of supporting an attachment member (100) regardless of whether it is inserted into the ladder insert space (40) "rightside-up" or "upside-down" or whether it faces "forward" or "backward." The internal symmetry of the individual components (and the spaces into which they engage the vertical support (10)) increases the ease of assembly and the number of configurations a shelving system (210) can attain.

Similarly, the internal symmetry of the vertical support (10) enhances the ease of assembly and the number of configurations a shelving system (210) can attain, as well as enhancing the aesthetic appeal of the assembled shelving system (210). In more preferred embodiments, the vertical support (10) has internal symmetry in at least one plane, and even more preferably, in two or more planes.

Specific embodiments of a dispensing system according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. It is understood to encompass the present invention and any and all modifications, variations, or equivalents that fall within the spirit and scope of the basic underlying principles disclosed and claimed herein.

What is claimed is:

1. A vertical support for mounting an attachment member with a powered appliance onto a shelving system, the vertical support comprising:
   (a) an external casing aligned vertically in use with the shelving system having a longitudinal aperture leading to a longitudinal hollow interior comprising:
      (i) a space for receiving a ladder insert, and
      (ii) a space for receiving a power delivery insert anterior to the ladder insert space;
   (b) the ladder insert having a plurality of spaced-apart perforations, the horizontal width of the perforations being greater than the width of the longitudinal aperture, the ladder insert engaging the ladder insert space so that the plurality of perforations face the longitudinal aperture and the power delivery insert space; and
   (c) the power delivery insert comprising;
      a channel for receiving an attachment element of the attachment member, the horizontal width of the channel being at least as wide as the horizontal width of the perforations of the ladder insert,
      a first power transmitter engaging an interior side of the channel, and
      a second power transmitter engaging a different interior side of the channel;
      wherein the power delivery insert engages the power delivery insert space so that the channel faces the plurality of perforations of the ladder insert;
      wherein the attachment member comprises a power clip, a powered appliance, and an attachment element for engaging at least one perforation of the ladder insert so that the power clip engages the first and second first power transmitters of the channel to make power available to the powered appliance,
      wherein the first and second first power transmitters comprise a strip of electrically conductive material, and
      the power clip includes a power contact on at least two sides of the attachment element for providing power to the powered appliance; and
      the power that is transmitted is electrical power.

2. The vertical support of claim 1, wherein the longitudinal aperture has edges that taper inward.

3. The vertical support of claim 1, wherein the longitudinal aperture has chamfered edges.

4. The vertical support of claim 1, wherein the electrically conductive material comprises copper.

5. The vertical support of claim 1, wherein the attachment member comprises one of the following: a shelf, a hanger, or a media board.

6. The vertical support of claim 1, wherein the attachment element comprises a bracket.

7. The vertical support of claim 1, wherein the powered appliance comprises one of the following: a light, a computer, a monitor, an audio system, or a credit card reader.

8. The vertical support of claim 1, wherein the perforations comprise vertical slots and the attachment element comprise downward-pointing hooks.

9. The vertical support of claim 1, wherein the longitudinal aperture has edges that taper inward.

10. A shelving system comprising at least one vertical support of claim 1.

11. A shelving system having at least one vertical support for mounting an attachment member with a powered appliance onto a shelving system, the vertical support comprising:
   (a) an external casing aligned vertically in use with the shelving system having a longitudinal aperture leading to a longitudinal hollow interior comprising:
      (i) a space for receiving a ladder insert, and
      (ii) a space for receiving a power delivery insert anterior to the ladder insert space;
   (b) the ladder insert having a plurality of spaced-apart perforations, the horizontal width of the perforations being greater than the width of the longitudinal aperture, the ladder insert engaging the ladder insert space so that the plurality of perforations face the longitudinal aperture and the power delivery insert space; and
   (c) the power delivery insert comprising;
      a channel for receiving an attachment element of the attachment member, the horizontal width of the channel being at least as wide as the horizontal width of the perforations of the ladder insert,
      a first power transmitter engaging an interior side of the channel, and
      a second power transmitter engaging a different interior side of the channel;
   wherein the power delivery insert engages the power delivery insert space so that the channel faces the plurality of perforations of the ladder insert;
   at least one horizontally-oriented external casing;
   at least one connector for connecting the vertical support to the horizontally-oriented external casing;
   at least one internal connection piece for connecting the vertical support to the horizontally-orientated external casing, wherein the internal connection piece engages the ladder insert space of the vertical support and the ladder insert space of the horizontally-oriented external casing; and comprises a fastener for fastening the internal connection piece to an external casing;
   the internal connection piece has approximately the same depth and width as the ladder insert;
   wherein the attachment member comprises a power clip, a powered appliance, and an attachment element for engaging at least one perforation of the ladder insert so that the power clip engages the first and second first power transmitters of the channel to make power available to the powered appliance through a power cord connecting the powered appliance to the power clip.

12. A shelving system of claim 11, wherein the internal connection piece comprises a fastener for fastening the internal connecting piece to an external casing.

* * * * *